United States Patent
Sendlakowski

(10) Patent No.: US 10,878,053 B2
(45) Date of Patent: Dec. 29, 2020

(54) DETECTING SELECTION OF DISABLED INNER LINKS WITHIN NESTED CONTENT

(71) Applicant: eBay Inc., San Jose, CA (US)

(72) Inventor: Michael Sendlakowski, Benicia, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/142,493

(22) Filed: Sep. 26, 2018

(65) Prior Publication Data

US 2020/0097610 A1    Mar. 26, 2020

(51) Int. Cl.
  *G06F 16/958*  (2019.01)
  *G06F 16/955*  (2019.01)
  *G06F 21/53*  (2013.01)

(52) U.S. Cl.
  CPC ...... *G06F 16/9558* (2019.01); *G06F 16/9566* (2019.01); *G06F 16/986* (2019.01); *G06F 21/53* (2013.01)

(58) Field of Classification Search
  CPC .................................................. G06F 17/22
  See application file for complete search history.

(56) References Cited

U.S. PATENT DOCUMENTS

| | | | |
|---|---|---|---|
| 5,978,428 A * | 11/1999 | Bates et al. | G06F 17/30 |
| 7,426,687 B1 | 9/2008 | Schultz et al. | |
| 8,392,823 B1 | 3/2013 | Schneider et al. | |
| 8,572,478 B2 * | 10/2013 | Lloyd et al. | G06F 17/00 |
| 8,856,869 B1 | 10/2014 | Brinskelle | |
| 9,075,777 B1 * | 7/2015 | Pope et al. | G06F 17/2235 |

(Continued)

FOREIGN PATENT DOCUMENTS

| | | |
|---|---|---|
| GB | 2557877 A | 7/2018 |
| JP | 2008-262423 A | 10/2008 |

(Continued)

OTHER PUBLICATIONS

"Disable all links inside IFRAME uing jQuery", Retreived from the Internet URL: <https://stackoverflow.com/questions/4777642/disable-all-links-inside-iframe-using-jquery>, Jun. 9, 2018, 5 pages.

(Continued)

*Primary Examiner* — James J Debrow
(74) *Attorney, Agent, or Firm* — SBMC

(57) ABSTRACT

Detecting selection of disabled inner links within nested content techniques are described herein. In one or more implementations, a document comprising nested content is displayed on a display of a computing device. The nested content is obtained from a third-party source and includes one or more disabled inner links to respective target portions within the nested content. A disabled link service monitors an address associated with the third-party source of the nested content to detect an address change corresponding to a user selection of one of the disabled inner links within the nested content. Responsive to detecting the address change, a respective target portion of the nested content associated with the selected inner link is located by scanning the nested content. The document is then scrolled to cause display of the target portion of the nested content on the display of the computing device.

20 Claims, 8 Drawing Sheets

(56) References Cited

U.S. PATENT DOCUMENTS

| | | |
|---|---|---|
| 9,547,665 B2 | 1/2017 | Wood et al. |
| 2006/0075069 A1* | 4/2006 | Mohan et al. .......... G06F 15/16 |
| 2009/0254529 A1 | 10/2009 | Goldentouch |
| 2010/0332993 A1 | 12/2010 | Bousseton et al. |
| 2013/0124974 A1* | 5/2013 | Song et al. ............. G06F 17/21 |
| 2014/0223574 A1* | 8/2014 | Margalit et al. ........ H04L 63/10 |
| 2015/0207803 A1 | 7/2015 | Cohen |
| 2016/0127358 A1* | 5/2016 | Engelking ........... H04L 63/0861 |
| 2016/0239468 A1* | 8/2016 | Capt et al. .............. G06F 17/22 |
| 2016/0335312 A1 | 11/2016 | Martin |
| 2019/0230080 A1* | 7/2019 | Boothby ................ H04L 29/06 |

FOREIGN PATENT DOCUMENTS

| | | |
|---|---|---|
| KR | 10-2015-0062104 A | 6/2015 |
| KR | 10-1624255 B1 | 5/2016 |
| WO | 2016/101754 A1 | 6/2016 |
| WO | 2020/068704 A1 | 4/2020 |

OTHER PUBLICATIONS

International Search Report received for PCT Patent Application No. PCT/US2019/052496, dated Jan. 28, 2020, 4 pages.
International Written Opinion received for PCT Patent Application No. PCT/US2019/052496, dated Jan. 28, 2020, 10 pages.

* cited by examiner

US 10,878,053 B2

DETECTING SELECTION OF DISABLED INNER LINKS WITHIN NESTED CONTENT

BACKGROUND

A common technique to place third-party content obtained from a third-party source (e.g., a document, report, image, or video) into a web page is to insert the third-party content into an HTML, inline frame element (iframe) of the web page. An iFrame is an HTML element that allows external third-party content to be embedded into an HTML document. Unlike traditional frames, which are used to create the structure of a webpage, iframes can be inserted anywhere within a webpage layout. In some cases, such third-party content may include "inner links" within the third-party content which are linked to respective target portions of the third-party content. For example, a third-party document may have a table of contents page which includes links to respective target portions of the document, such that selection of an inner link causes the document to "jump" to the associated target portion.

Conventionally, an executable script of the third-party content (e.g., JavaScript), automatically detects a user selection of an inner link within the third-party content, and reports the selection to the parent document, so that the parent document can display the associated target portion of the third-party content. However, for security reasons, developers may render the third-party content within the parent document with a "sandbox" flag enabled, which disables the executable script within the third-party content. With the executable script disabled, there is no way to listen for user selection of inner links, and thus these types of inner links will appear "broken" to the user.

SUMMARY

Detecting selection of disabled inner links within nested content techniques are described herein. In one or more implementations, a service provider system obtains third-party content from a third-party source. The third-party content includes one or more inner links to respective target portions within the third-party content. The service provider system disables the one or more inner links of the third-party content, and then embeds the third-party content with the disabled inner links into a document. In order to enable detection of the disabled inner links, the service provider system provides a disabled link service for the document. The disabled link service is configured to detect a user selection of the disabled inner link and determine a scroll position usable to scroll the document to cause display of a respective target portion of the third-party content.

In one or more implementations, a document comprising nested content is displayed on a display of a computing device. The nested content is obtained from a third-party source and includes one or more disabled inner links to respective target portions within the nested content. A disabled link service monitors an address associated with the third-party source of the nested content to detect an address change corresponding to a user selection of one of the disabled inner links within the nested content. Responsive to detecting the address change, a respective target portion of the nested content associated with the selected inner link is located by scanning the nested content. The document is then scrolled to cause display of the target portion of the nested content on the display of the computing device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
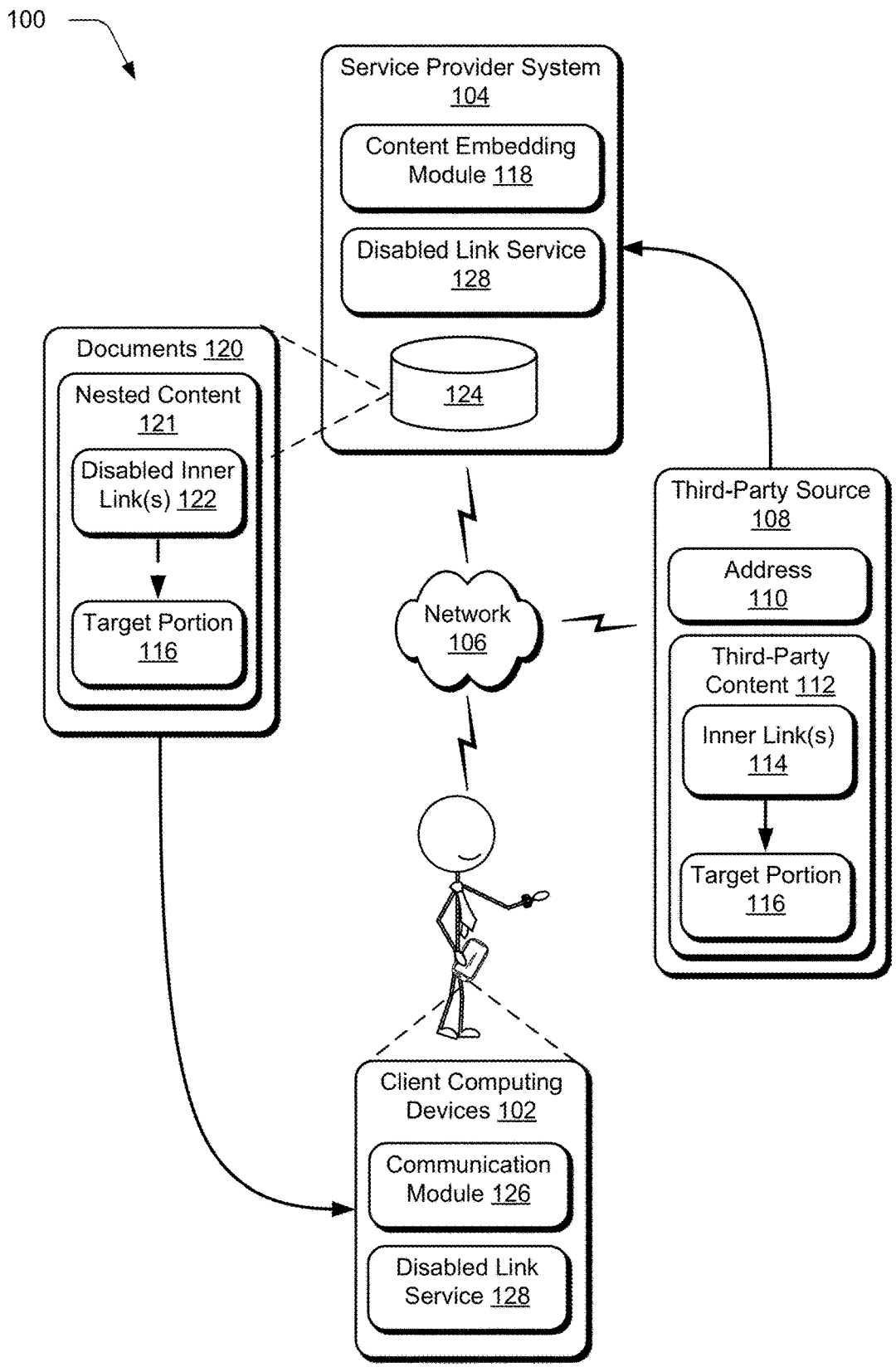
FIG. 1 is an illustration of an example environment to employ techniques described herein.

Detecting selection of disabled inner links within nested content techniques are described herein. The described techniques can detect user selection of inner links within nested content displayed within a document even when such inner links are disabled. In one or more implementations, a service provider system obtains third-party content from a third-party source. The third-party content includes one or more inner links to respective target portions within the third-party content. The inner links, for example, are configured to cause navigation to the respective target portions within the third-party content responsive to user selection. Notably, inner links are described herein as links within content to a different portion of the same content, and thus are distinguished from external links within third-party content which link to a source that is external to the third-party content, such as a remote web page.

The service provider system embeds the third-party content into a document, such as an HTML document which is accessible over a network as a web page. As described herein, content (e.g., third-party content) that is embedded into a document is referred to as nested content. In one or more implementations, the nested content is embedded into an HTML inline frame element (iframe) of the document. When embedding the nested content, the service provider system disables the inner links within the nested content. As described herein, a disabled inner link corresponds to an inner link of nested content which has been disabled such that user selection of the disabled inner link does not cause automatic navigation to the respective target portion.

In some cases, the inner links are disabled, for security reasons, by rendering the nested content within the parent document with a "sandbox" flag enabled. Doing so disables the executable script (e.g., JavaScript) within the nested content. When the executable script is disabled, conventional solutions are unable to detect user selection of inner links, and thus these types of inner links will appear "broken" to the user.

In order to enable detection of the disabled inner links within nested content, the service provider system provides a disabled link service for the document. The disabled link service is configured to detect a user selection of the disabled inner link and determine a scroll position usable to scroll the document to cause display of a respective target portion of the nested content. Even though the inner links are disabled, a user selection of an inner link updates an address (e.g., iframe URL) of the nested content. Thus, the disabled link service is configured to monitor the address of the third-party source of the nested content to detect an address change corresponding to a user selection, at a computing device, of one of the disabled inner links within the nested content. Responsive to detecting the address change which is indicative of the user selection of the inner link, the disabled link service locates a respective target portion of the nested content associated with the selected inner link by scanning the nested content. The document is then scrolled to cause display of the target portion of the nested content on a display of the computing device. Notably, the nested content itself does not scroll or move within the document, but rather the document is scrolled in order to display the target portion of the nested content.

Thus, unlike conventional solutions, the described techniques enable disabled inner links within nested content to function properly (e.g., by scrolling to the respective target portion when a disabled link is selected) even when the sandbox flag is enabled. Doing so ensures that documents, such as web pages, are not attacked by malicious script in the nested content, while at the same time enabling the display of an otherwise unmodified version of the nested content. In this way, the described techniques provide a solution that is acceptable to both the providers of parent web pages as well as the providers of the nested content.

Example Environment

FIG. 1 is an illustration of an example environment to employ techniques described herein. The illustrated example includes client computing devices 102 and a service provider system 104, which are communicatively coupled via a network 106. Computing devices that are usable to implement the client computing device 102 and the service provider system 104 may be configured in a variety of ways. A computing device, for instance, may be configured as a desktop computer, a laptop computer, a mobile device (e.g., assuming a handheld configuration such as a tablet or mobile phone), wearable devices (e.g., a smartwatch, a smart ring, a fitness band, smart glasses), virtual reality devices, augmented reality devices, holographic devices, and so forth. Thus, computing devices may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 7.

The service provider system 104 provides services accessible via the network 106 to client devices, such as the client computing device 102. In some cases, the service provider system 104 exposes generated digital content via a distribution platform in connection with the obtained information. For instance, the service provider system 104 exposes digital content configured as a listing-for-sale via an electronic commerce platform, e.g., eBay®. Although a single service provider system 104 is depicted in the illustrated example 100, the client computing devices 102 may be configured to access multiple service providers over the network 106 to leverage their respective services, such as a first service provider for performing searches based on search query input and a second service provider for exposing listings based on obtained listing information.

The illustrated example further includes a third-party source 108 with a corresponding address 110. The third-party source 108, for example, may correspond to a web page associated with a URL address. The service provider system 104 obtains third-party content 112 from the third-party source 108, such as over the network 106. For example, the third-party content 108 may correspond to a document, report, images, video, or any other type of content. The third-party content 112 includes one or more inner links 114 to respective target portions 116 within the third-party content 112. The inner links 114, for example, are configured to cause navigation to the respective target portions 116 within the third-party content 112 responsive to user selection. Notably, inner links 114 are described herein as links within content to a different portion of the same content, and thus are distinguished from external links within third-party content which link to a source that is external to the third-party content.

The service provider system 104 is illustrated as including a content embedding module 118 ("embedding module 118") which represents functionality of the service provider system 104 to embed third-party content 112 into documents 120 provided by the service provider system 104 over the network 106. Such documents 120, for example, may correspond to an HTML document which is accessible over network 106 as a web page. As described herein, content (e.g., third-party content 112) that is embedded into a document 120 by embedding module 118 is referred to as nested content 121.

In one or more implementations, the embedding module 118 embeds the nested content 121 into an HTML inline frame element (iframe) of the HTML document 120. An iframe is an HTML element that allows an external third-party content to be embedded into an HTML document. Unlike traditional frames, which were used to create the structure of a webpage, iframes can be inserted anywhere within a webpage layout. The embedding module 118 can insert the nested content 121 into the document 120 using an iframe tag which inserts third-party content 112 into the document 120. The iframe tag, for example, may include the third-party source address 110 of the third-party content. An example of an iframe tag is reproduced below:

<iframe
Src="http://website.com/example.php" width="728" height="90">
</iframe>

In the example above, the iframe tag identifies the address 110 of the third-party content source 108 of the third-party content 112 ("http:/website.com/example.php"), as well as width and height attributes defining the size of the iframe within the document 120. Notably, the width and height attributes are not required, and the iframe tag may also include other attributes such as margin width and height.

In order to safely insert the nested content 121 into the document 120, the embedding module 118 disables the inner links 114 to generate disabled inner links 122. As described herein, a disabled inner link 122 corresponds to an inner link 114 of nested content 121 which has been disabled such that user selection of the disabled inner link does not cause automatic navigation to the respective target portion 116. Disabling, for example, may correspond to disabling executable script associated with the nested content 121 which is configured to monitor for the user selection of the inner link, report the selection, and/or cause navigation to the respective target portion.

In some cases, the inner links are disabled, for security reasons, by rendering the nested content 121 within the parent document 120 with a "sandbox" flag enabled. Doing so disables the executable script (e.g., JavaScript) within the nested content 121. When the executable script is disabled, conventional solutions are unable to detect user selection of inner links, and thus these types of inner links will appear "broken" to the user. Notably, while the sandbox flag may be enabled, the nested content 121 may otherwise be presented within the document 120 in an unmodified form. The documents 120 with embedded nested content 121 and disabled inner links 122 are illustrated as being stored in a storage 124 at the service provider system 104.

The client computing device 102 is illustrated with a communication module 126, which represents functionality to enable communication with service provider 104. The communication module 126, for example, may be configured as a web browser or application, and so forth, which is configured to access documents 120, with nested content 121, such as by navigating to a corresponding address (e.g., URL) of the document 120 of the service provider system 104.

The service provider system 104 is further illustrated as providing a disabled link service 128 which is representative of functionality to monitor for and detect a user selection of a disabled inner link 122 in the nested content 121, and then to scroll the document 120 to display the respective target portion 116 of the selected inner link. Notably, the disabled link service 128 does so without the use of executable script of the nested content 121. Although illustrated as being implemented at the service provider system 104 and remote from client computing devices 102, functionality of the illustrated disabled link service 128 may also be implemented in whole or part locally at the client computing devices 102, such as part of a web browser or application executed at the client device or code inserted into the nested content 121.

Figure 2:
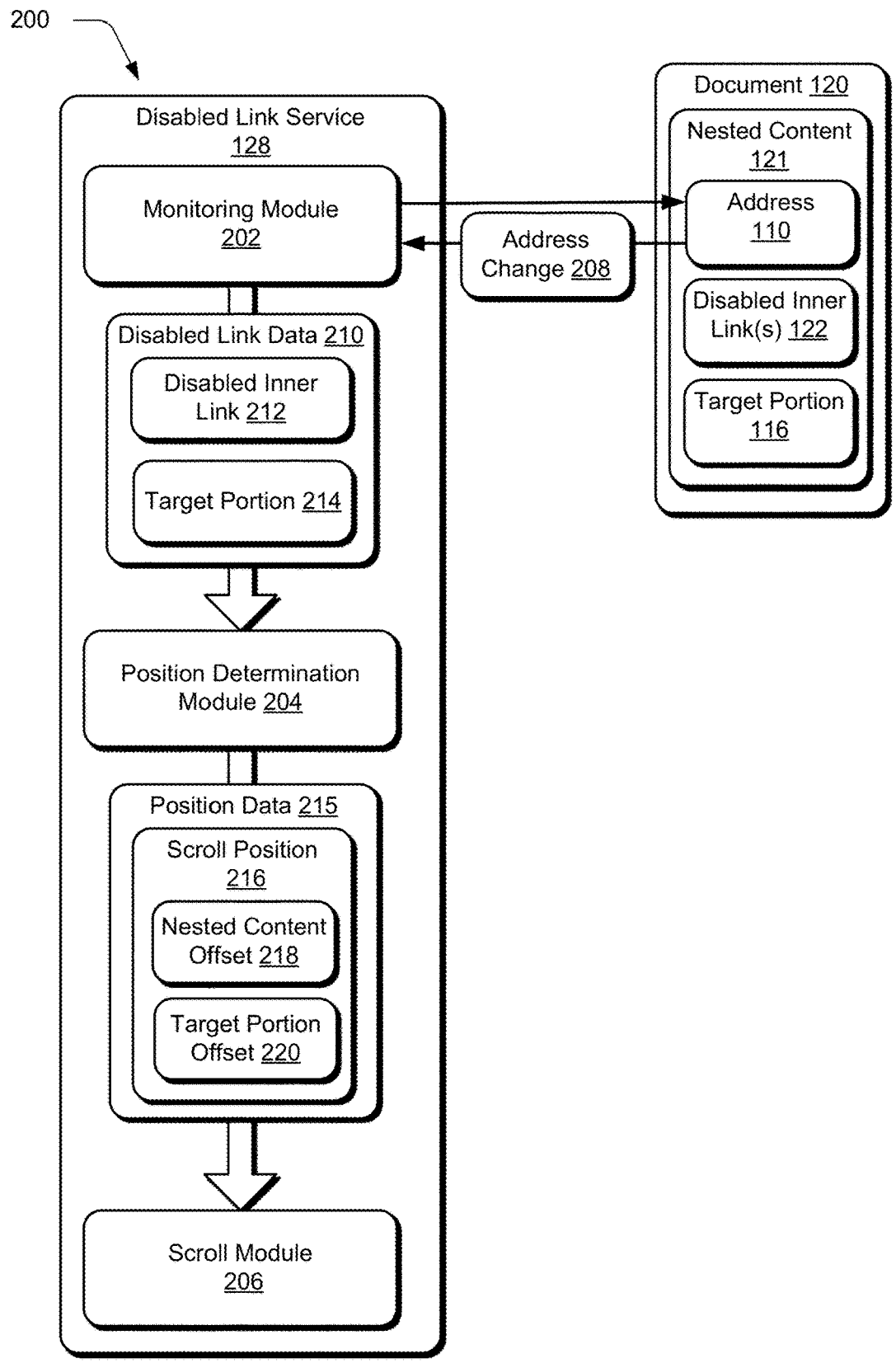
FIG. 2 depicts an example system 200 showing operation of the disabled link service 128 of FIG. 1 in more detail.

FIG. 2 depicts an example system 200 showing operation of the disabled link service 128 of FIG. 1 in more detail.

Figure 3A:
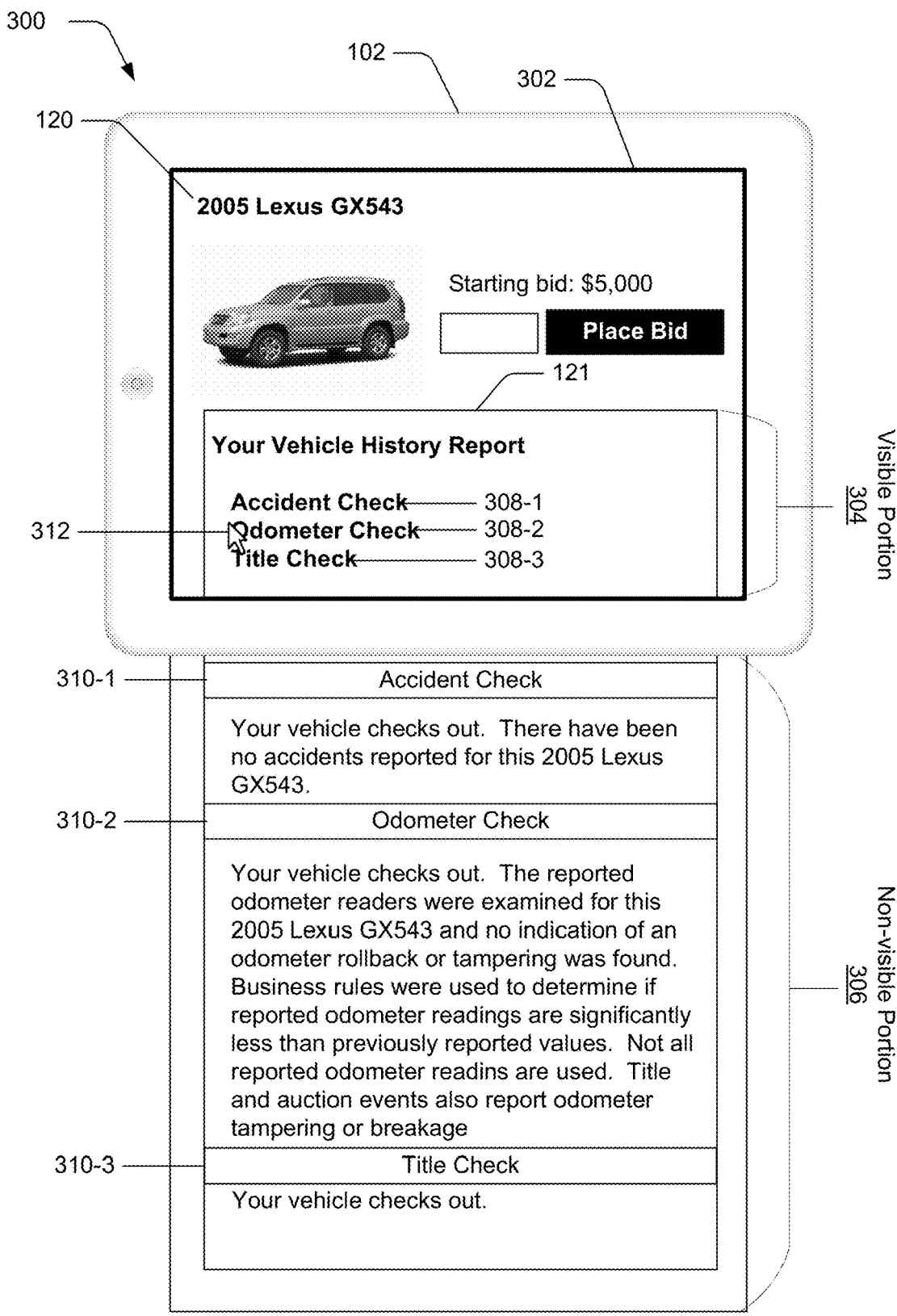
FIGS. 3A and 3B illustrates an example of a scrolling a document with nested content containing inner links to target portions within the nested content corresponding to a selected inner link.
Figure 3B:
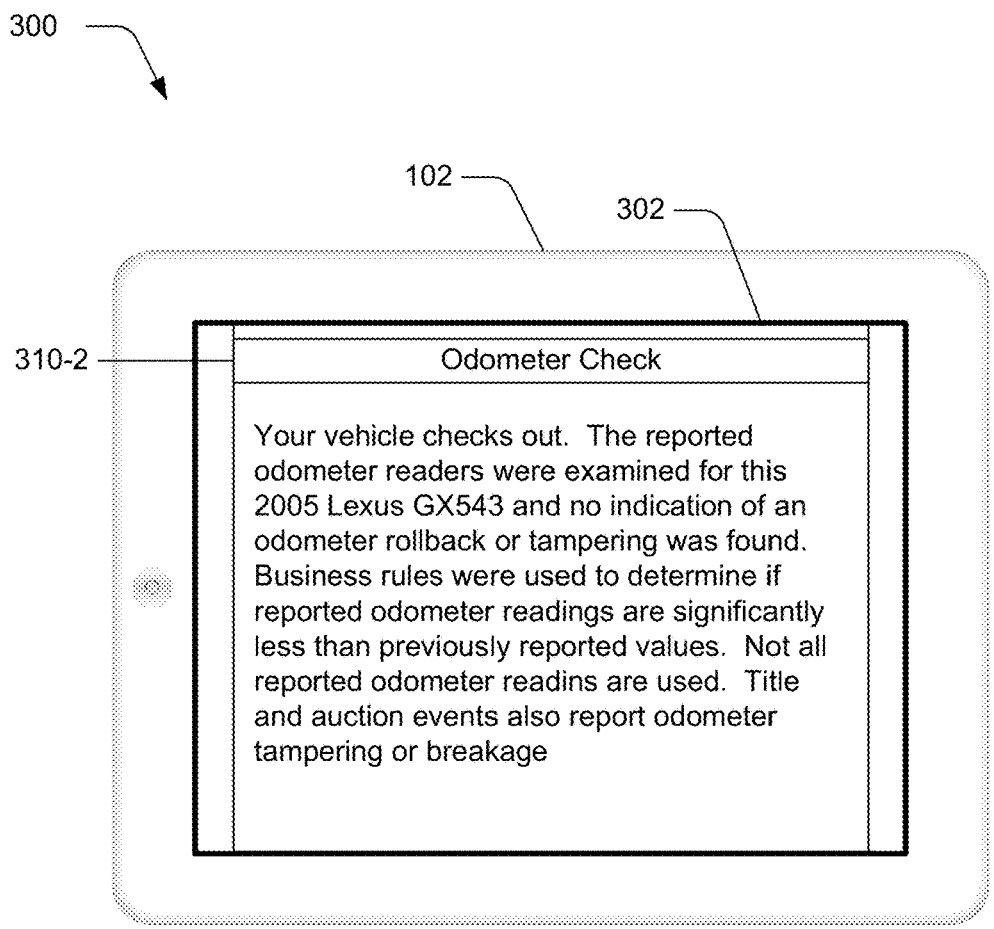

In system 200, a communication module 126 at client computing device 102 displays a document 120 with nested content 121. As discussed throughout, the nested content 121 may correspond to third-party content 112 obtained from a third-party source 108 and embedded into document 120 by embedding module 118. Consider, for example, FIGS. 3A and 3B which illustrate an example 300 of a scrolling a document with nested content containing inner links to target portions within the nested content corresponding to a selected inner link. In FIG. 3A, a client computing device 102 displays a document 120 on a display screen 302 of the client computing device 102. The document 120, in this example, corresponds to a web page to purchase a vehicle. The document 120 includes nested content 121, which in this example is shown as including a visible portion 304 and a non-visible portion 306. As described herein, the visible portion 304 corresponds to a portion of the nested content 121 which is currently displayed on the display screen 302 of the client computing device 102, whereas the non-visible portion 306 corresponds to a different portion of the nested content 121 which is not currently displayed on the display screen 302.

In this example, consider that the nested content 121 is obtained from a third-party website having the address "www.vehiclehistoryreport.com". The nested content 121 includes inner links 308-1, 308-2, and 308-3 to respective target portions 310, which in this example includes inner links to an "Accident Check" target portion 310-1 of the nested content 121, an "Odometer Check" target portion 310-2 of the nested content 121, and a "Title Check" target portion 310-3 of the nested content 121. As discussed throughout, the inner links 308 are disabled by the embedding module 118 when the nested content 121 is embedded into the document 120. Disabling the inner links 308 prevents automatic navigation to the respective target portions 310 when the inner link 308 is selected. Disabling, for example, may correspond to disabling executable script, such as JavaScript, which is associated with the nested content 121. In some cases, the inner links 308 are disabled, for security reasons, by rendering the nested content 121 within the document 120 with a "sandbox" flag enabled.

In example 300, the displayed inner links 308 are visible on the display screen 302, while the respective target portions 310 are not. It is to be appreciated, however, that the inner links 308 and target portions 310 may be visible or non-visible based on the current display position of the document 120 on the display screen 302 of client computing device 102.

The illustrated example 300 is also depicted with a cursor 312. In the following examples, the display of a cursor generally represents a focus of user input in relation to the user interfaces. However, it is to be appreciated that the cursor 312 is merely representative of user input focus. In scenarios where user inputs are received using touch functionality, user gestures (e.g., hand, voice, or eye movement), or a stylus device, for instance, the cursor 312 may not be displayed in connection with the document 120. In some cases, the user inputs can be received via user interactions with a holographic display device, such as a head-mounted virtual reality or augmented reality device. However, in scenarios involving mouse-based input the cursor 312 may nevertheless be displayed.

In system 200, the disabled link service 128 is illustrated as including a monitoring module 202, a position determination module 204, and a scroll module 206. The monitoring module 202 is representative of functionality to monitor the address 110 of the third-party source 108 providing the nested content, such as a URL of a third-party website. The monitoring module 202 monitors the address 110 to detect an address change 208 corresponding to a user selection of one of the disabled inner links 122 within the nested content 121. Even though the inner links are disabled, a user selection of a disabled inner link 212 updates the address (e.g., iFrame URL) of the nested content 121. Returning to FIG. 3A, for instance, the user controls cursor 312 to select the "Odometer Check" inner link 308-2 displayed within the nested content 121. Doing so causes the URL address of the vehicle history report, to change to "www.vehiclehistoryreport.com#odometercheck". Thus, even though selection of the link does not cause automatic navigation to the respective target portion, the monitoring module 202 detects this address change, and based on the detection, can determine that the inner link has been selected by the user. The monitoring module 202 is implemented to monitor for the address change 208, such as by periodically (e.g., every 200 ms) checking the address 110 associated with the nested content 121.

Responsive to detecting the address change, the monitoring module 202 of the disabled link service 128 generates disabled link data 210 containing the selected disabled inner link 212 and a target portion 214 associated with the selected inner link. The address change 208 provides an identifier of the disabled inner link 212 which was selected, and thus the monitoring module 202 can identify the selected inner link based on the address change. The monitoring module 202 then locates the corresponding target portion 214 by scanning the nested content 121 to locate the respective target portion 214.

The position determination module 204 of the disabled linked service 128, determines position data 215 usable by the scroll module to scroll the document 120 in order to display the target portion 214 of the nested content 121. The position data 215 includes a scroll position 216 of the respective target portion 214. The scroll position 216 corresponds to a position in the document 120 at which the respective target portion 214 of the nested content 121 is positioned. The scroll module 206 obtains the scroll position 216 and scrolls the document 120 to the scroll position 216 to cause display of the target portion 214 of the nested content 121. Notably, the scroll module 206 scrolls the document 120, and not the nested content 121, in order to cause display of the target portion 214. In other words, the nested content 121 itself does not scroll or move within the document 120, but rather the document 120 is scrolled in order to display the target portion 214 of the nested content 121. Consider, for example, FIG. 3B in which the document 120 has been scrolled so that the target portion 310-2 associated with the selected inner link 308-2 (e.g., the Odometer check) is now displayed on the display screen.

The scroll position 216 of the respective target portion 214 of the selected inner link can be determined by the position determination module 204 in a variety of different ways. In some cases, the position determination module 204 determines the scroll position 216 based on a nested content offset 218 corresponding to a position of the nested content 121 relative to the document 120, and a target portion offset 220 corresponding to a position of the target portion 214 relative to the nested content 121.

Figure 4:
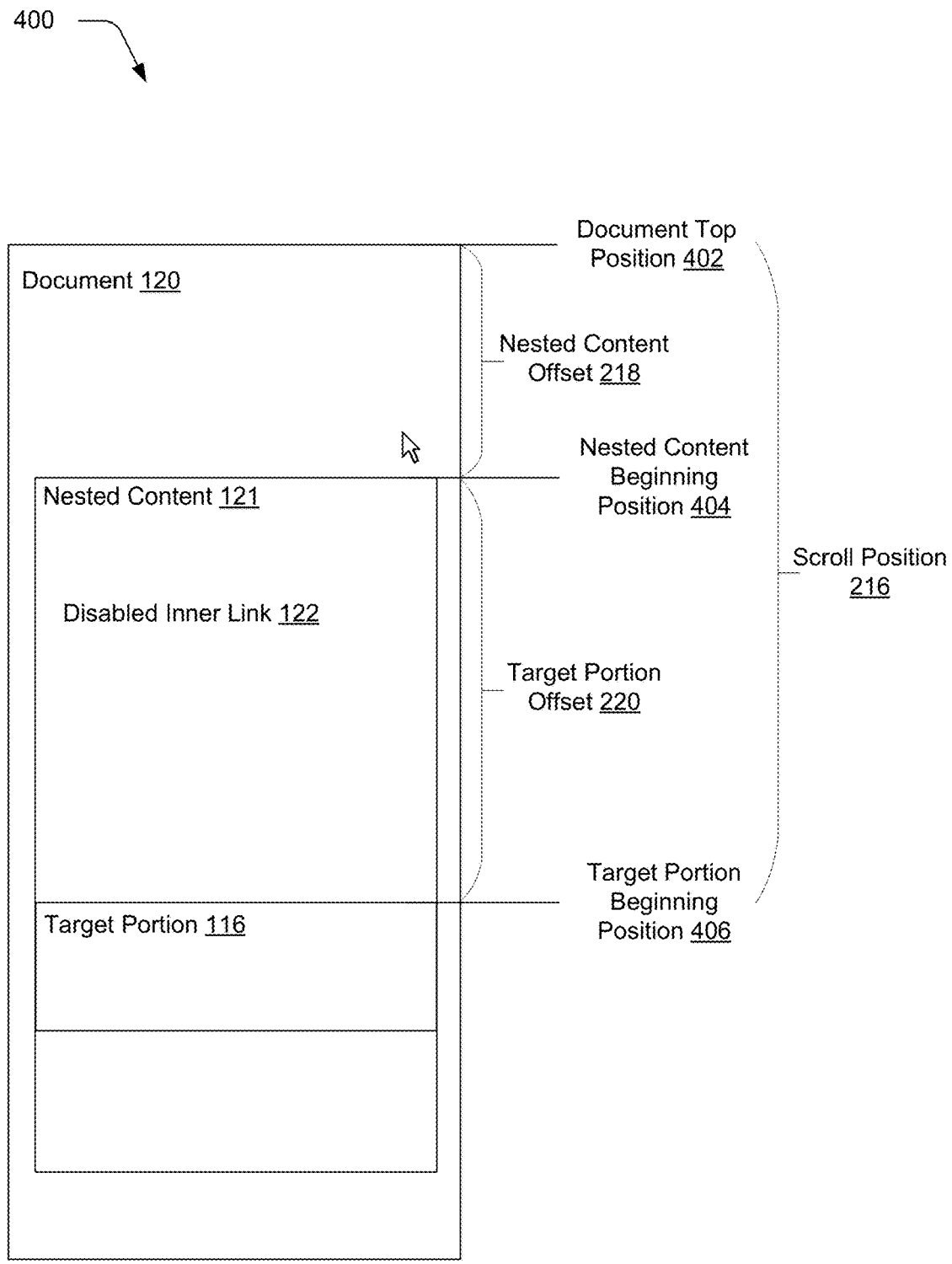
FIG. 4 illustrates an example of determining a scroll position in accordance with one or more implementations.

Consider, for example, FIG. 4 which illustrates an example 400 of determining a scroll position in accordance with one or more implementations. In example 400, the nested content offset 218 may be calculated by the position determination module 204 as a distance from a document top position 402 of the document 120 to a nested content beginning position 404 of the nested content 121 within the document 121. Similarly, the target portion offset 220 can be calculated by the position determination module 204 as a distance from the nested content beginning position 404 of the nested content 121 to a target portion beginning position 406 of the target portion 214 within the nested content 121. The position determination module 204 then determines the scroll position 216 as based on the nested content offset 218 and the target portion offset 220, such as by calculating the sum of the nested content offset 218 and the target portion offset 220.

Example Procedures

This section describes example procedures for detecting selection of disabled inner links within nested content techniques. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 5:
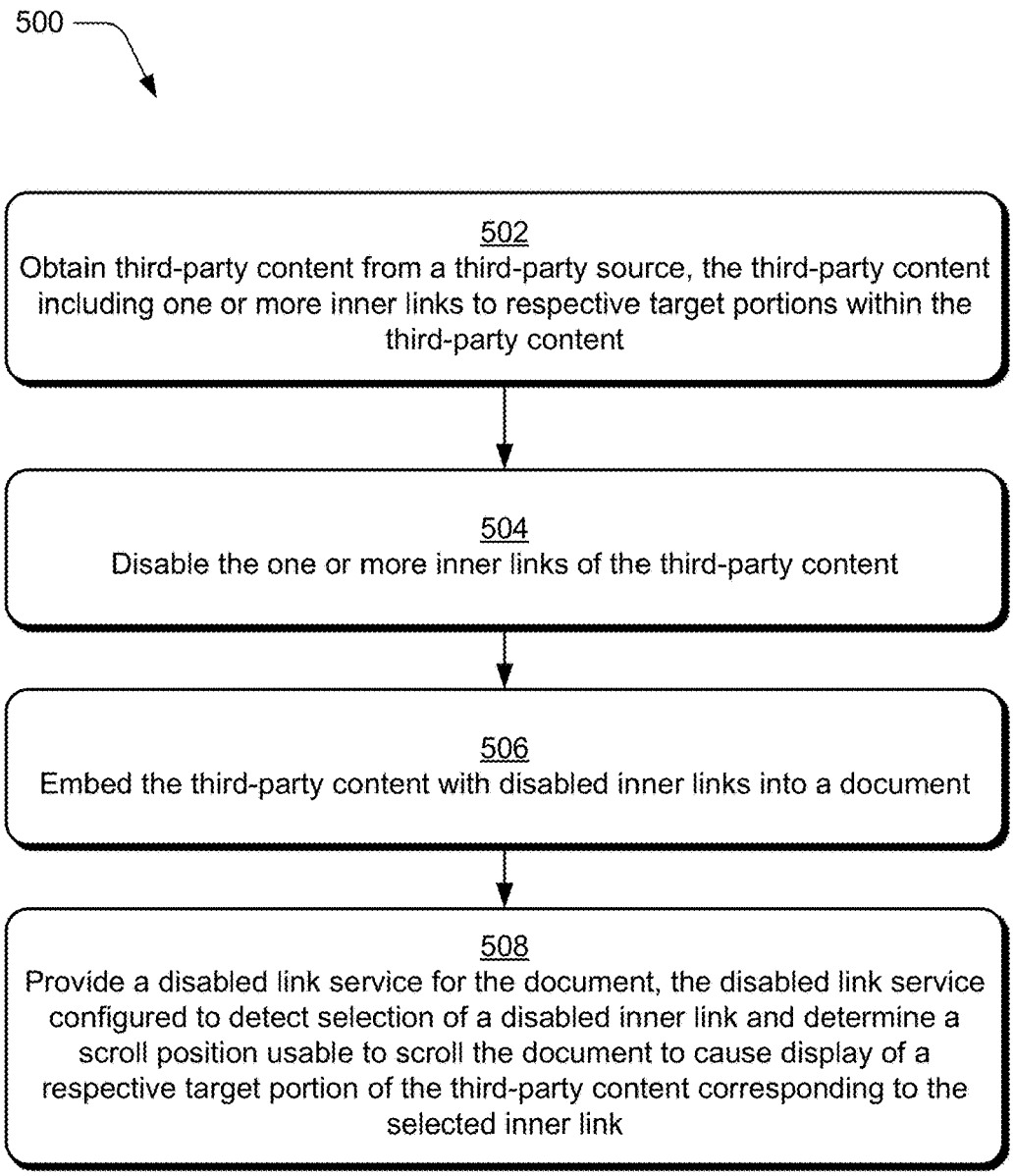
FIG. 5 depicts an example procedure of embedding third-party content with disabled inner links into a document in accordance with one or more implementations.

FIG. 5 depicts an example procedure 500 of embedding third-party content with disabled inner links into a document in accordance with one or more implementations. To begin procedure 500, third-party content is obtained from a third-party source, where the third-party content includes one or more inner links to respective target portions within the third-party content (block 502). By way of example, service provider system 104 obtains third-party content 112 from the third-party source 108, such as over the network 106. For example, the third-party content 112 may correspond to a document, report, images, video, or any other type of content. The third-party content 112 includes one or more inner links 114 to respective target portions 116 within the third-party content 112. The inner links 114, for example, are configured to cause navigation to the respective target portions 116 within the third-party content 112 responsive to user selection.

The one or more inner links of the third-party content are disabled (block 504), and the third-party content with disabled inner links is embedded into a document (block 506). For example, an embedding module 118 of the service provider system 104 embeds third-party content 112 into documents 120 provided by the service provider system 104 over the network 106. Such documents 120, for example, may correspond to an HTML, document which is accessible over network 106 as a web page. In some cases, the embedding module 118 embeds the third-party content 112 into an HTML inline frame element (iFrame) of the document 120.

In order to safely insert the nested content 121 into the document 120, the embedding module 118 disables the inner links 114 to generate disabled inner links 122. Disabling, for example, may correspond to disabling executable script associated with the nested content 121 which is configured to monitor for the user selection of the inner link, report the selection, and/or cause navigation to the respective target portion. In some cases, the inner links are disabled, for security reasons, by rendering the nested content 121 within the parent document 120 with a "sandbox" flag enabled. Doing so disables the executable script (e.g., JavaScript) within the nested content 121. When the executable script is disabled, conventional solutions are unable to detect user selection of inner links, and thus these types of inner links will appear "broken" to the user. Notably, while the sandbox flag may be enabled, the nested content 121 may otherwise be presented within the document 120 in an unmodified form. The documents 120 with embedded nested content 121 and disabled inner links 122 are illustrated as being stored in a storage 124 at the service provider system 104.

A disabled link service for the document is provided, where the disabled link service is configured to detect a user selection of the disabled inner link, and determine a scroll position usable to scroll the document to cause display of a respective target portion of the third-party content (block 508). By way of example, the service provider system 104 provides a disabled link service 128 to monitor for and detect a user selection of a disabled inner link 122 in the nested content 121, and then to scroll the document 120 to display the respective target portion 116 of the selected inner link. Notably, the disabled link service 128 does so without the use of executable script of the nested content 121.

Figure 6:
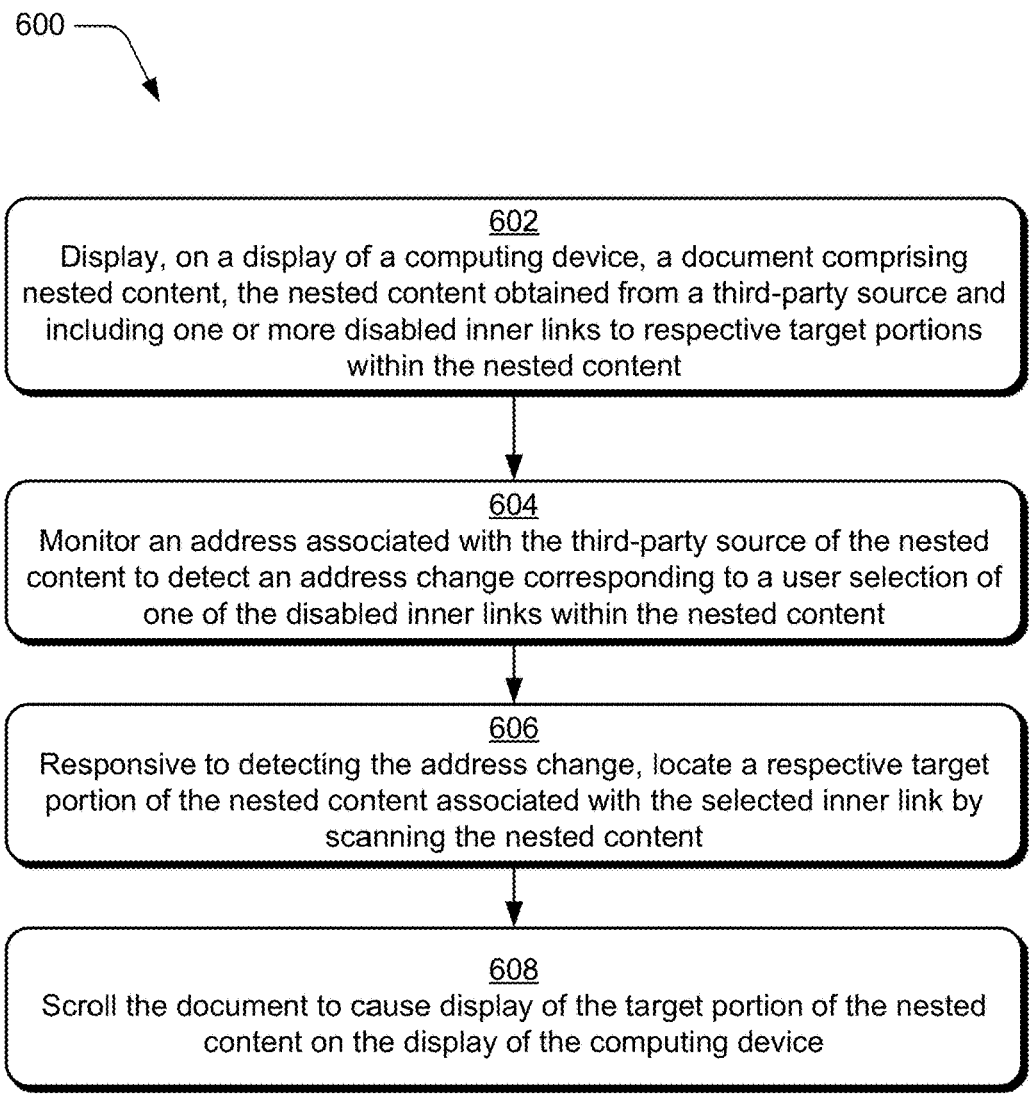
FIG. 6 depicts an example procedure of scrolling a document to display a target portion of nested content associated with a selected inner link in accordance with one or more implementations.

FIG. 6 depicts an example procedure 600 of scrolling a document to display a target portion of nested content associated with a selected inner link in accordance with one or more implementations. To begin procedure 600, a document comprising nested content is displayed on a display of a computing device, where the nested content is obtained from a third-party source and includes one or more disabled inner links to respective target portions within the nested content (block 602). By way of example, a communication module 126 at client computing device 102 displays a document 120 with nested content 121 obtained from a third-party source 108 and embedded into document 120 by embedding module 118. The nested content 121 includes one or more disabled inner links 122 to respective target portions 116 within the nested content 121.

An address associated with the third-party source of the nested content is monitored to detect an address change corresponding to a user selection of one of the disabled inner links within the nested content (block 604). For example, the monitoring module 202 of the disabled link service 128 monitors the address 110 of the third-party source 108 providing the nested content, such as a URL of a third-party website. The monitoring module 202 monitors the address 110 to detect an address change 208 corresponding to a user selection of one of the disabled inner links 122 within the nested content 121. Even though the inner links are disabled, a user selection of a disabled inner link 212 updates the address (e.g., iframe URL) of the nested content 121.

Responsive to detecting the address change, a respective target portion of the nested content associated with the selected inner link is located by scanning the nested content (block 606). For example, responsive to detecting the address change, the monitoring module 202 of the disabled link service 128 generates disabled link data 210 containing the selected disabled inner link 212 and a target portion 214 associated with the selected inner link. The address change 208 provides an identifier of the disabled inner link 212 which was selected, and thus the monitoring module 202 can identify the selected inner link based on the address change. The monitoring module 202 then locates the corresponding target portion 214 by scanning the nested content 121 to locate the respective target portion 214.

The document is scrolled to cause display of the target portion of the nested content on the display of the computing device (block 608). For example, the position determination module 204 of the disabled linked service 128, determines position data 215 usable by the scroll module to scroll the document 120 in order to display the target portion 214 of the nested content 121. The position data 215 includes a scroll position 216 of the respective target portion 214. The scroll position 216 corresponds to a position in the document 120 at which the respective target portion 214 of the nested content 121 is positioned. The scroll module 206 obtains the scroll position 216 and scrolls the document 120 to the scroll position 216 to cause display of the target portion 214 of the nested content 121. Notably, the scroll module 206 scrolls the document 120, and not the nested content 121, in order to cause display of the target portion 214. In other words, the nested content 121 itself does not scroll or move within the document 120, but rather the document 120 is scrolled in order to display the target portion 214 of the nested content 121.

The scroll position 216 of the respective target portion 214 of the selected inner link can be determined by the position determination module 204 in a variety of different ways. In some cases, the position determination module 204 determines the scroll position 216 based on a nested content offset 218 corresponding to a position of the nested content 121 relative to the document 120, and a target portion offset 220 corresponding to a position of the target portion 214 relative to the nested content 121.

Having described example procedures in accordance with one or more implementations, consider now an example system and device that can be utilized to implement the various techniques described herein.

Example System and Device

Figure 7:
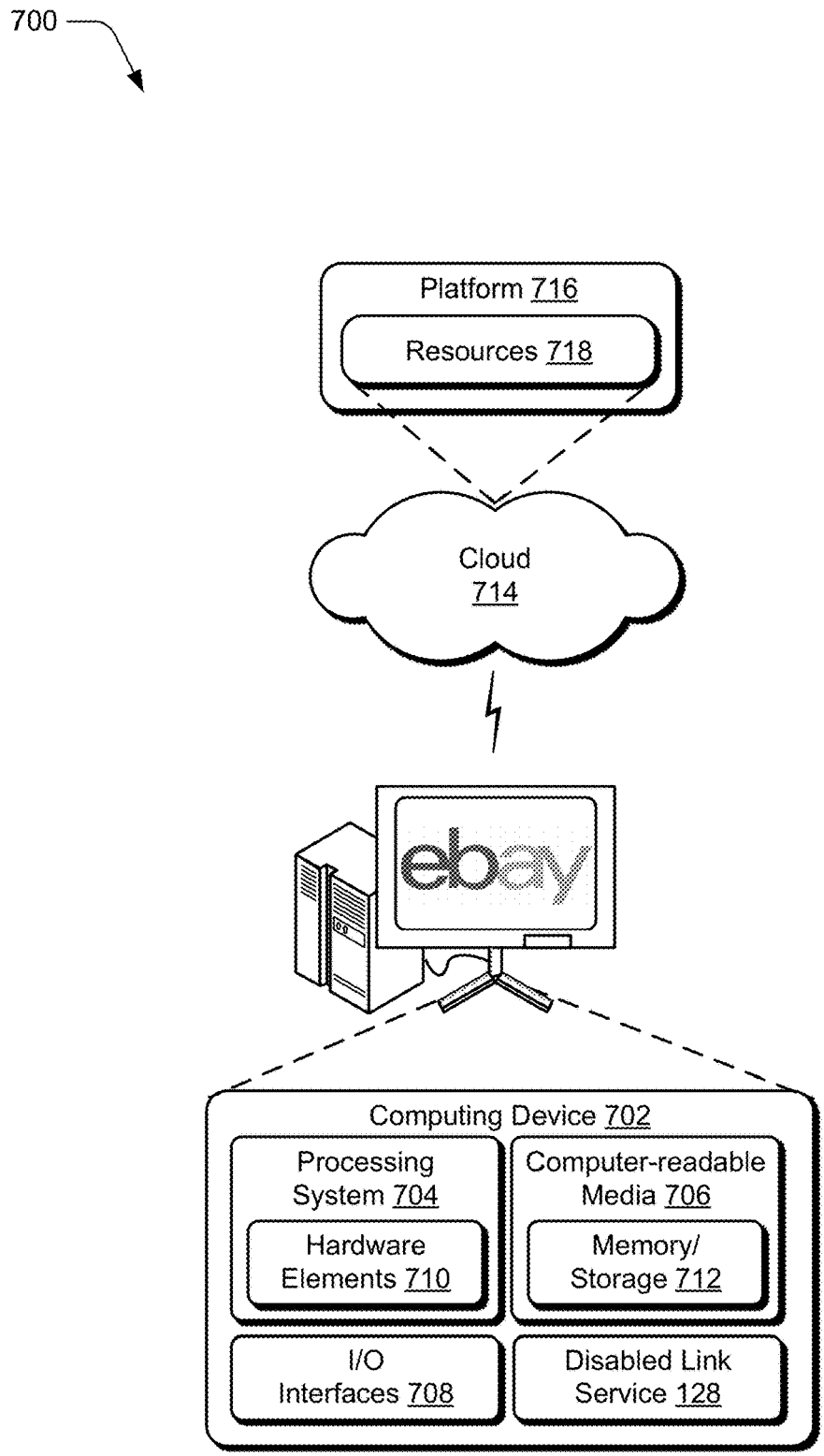
FIG. 7 illustrates an example system that includes an example computing device that is representative of one or more computing systems and/or devices that may implement the various techniques described herein.

FIG. 7 illustrates an example system generally at 700 that includes an example computing device 702 that is representative of one or more computing systems and/or devices that may implement the various techniques described herein. This is illustrated through inclusion of the disabled link service 128. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
disabling one or more inner links of third-party content;
embedding the third-party content with the one or more disabled inner links into a document as nested content;
displaying, on a display of a computing device, the document including the nested content;
detecting a user selection of one of the disabled inner links within the nested content; and
scrolling the document to cause display of a target portion of the nested content on the display of the computing device, the target portion associated with the selected inner link.

2. The method as described in claim 1, wherein the document comprises an HTML document.

3. The method as described in claim 2, wherein the nested content is displayed within an HTML inline frame element (iframe) of the HTML document.

4. The method as described in claim 1, wherein the detecting further comprises monitoring an address associated with a third-party source of the nested content to detect an address change corresponding to the user selection of the disabled inner link within the nested content.

5. The method as described in claim 4, wherein the address comprises a URL of the third-party source at which the nested content is located.

6. The method as described in claim 1, wherein an executable script of the nested content is disabled causing the disabled inner links to be disabled, and wherein the executable script comprises JavaScript.

7. The method as described in claim 6, wherein the nested content is displayed within the document with a sandbox flag enabled thereby causing the executable script of the nested content to be disabled.

8. The method as described in claim 1, wherein the displaying the nested content comprises displaying the nested content without modifying the nested content.

9. The method as described in claim 1, wherein the scrolling the document to cause display of the target portion of the nested content further comprises:
determining a nested content offset by calculating a distance from a top position of the document to nested content beginning position of the nested content within the document;
determining a target portion offset by calculating a distance from the nested content beginning position to a target portion beginning position of the target portion within the nested content;
determining a scroll position based on the nested content offset and the target portion offset; and
scrolling the document to the scroll position to cause display of the target portion of the nested content on the display of the computing device.

10. The method as described in claim 1, wherein the document comprises a web page located at a different address than an address associated with a third-party source of the third-party content.

11. The method as described in claim 1, wherein the detecting comprises monitoring an address associated with a third-party source of the nested content to detect an address change corresponding to the user selection of the one of the disabled inner links within the nested content, and wherein the target portion of the nested content is located by scanning the nested content.

12. The method as described in claim 1, wherein the disabling comprises disabling an executable script of the third-party content which is configured to monitor for user selection of the one or more inner links of the third-party content.

13. The method as described in claim 12, wherein the detecting comprises detecting the user selection of the one or more disabled inner links within the nested content without using the disabled executable script of the third-party content.

14. The method as described in claim 13, wherein the detecting comprises detecting an address change of a third-party source of the third-party content.

15. A service provider system comprising:
at least one processor; and
memory having stored thereon computer-readable instructions that are executable by the at least one processor to perform operations comprising:
obtaining third-party content from a third-party source, the third-party content including one or more inner links to respective target portions within the third-party content;
disabling the one or more inner links of the third-party content;
embedding the third-party content with disabled inner links into a document as nested content;
providing a disabled link service for the document, the disabled link service configured to detect a user selection of the disabled inner link, and determine a scroll position usable to scroll the document to cause display of a respective target portion of the third-party content.

16. The service provider system as described in claim 15, wherein the third-party content is embedded into an HTML inline frame element (iframe) of the document.

17. The service provider system as described in claim 15, wherein the disabled link service is configured to detect the user selection of the disabled inner link by detecting an address change of an address of the third-party source.

18. The service provider system as described in claim 17, wherein the address comprises a URL of the third-party source at which the third-party content is located.

19. A computing device comprising:
a display; and
at least a memory and a processor to perform operations comprising:
disabling one or more inner links of third-party content;
embedding the third-party content with the one or more disabled inner links into a document as nested content;
displaying, on the display, the document including the nested content;
detecting a user selection of one of the disabled inner links within the nested content; and
scrolling the document to cause display of a target portion of the nested content on the display of the computing device, the target portion associated with the selected inner link.

20. The computing device as described in claim 19, wherein the nested content is displayed within the document with a sandbox flag enabled thereby causing an executable script of the nested content to be disabled.

* * * * *